United States Patent [19] [11] 4,005,941
Laborde [45] Feb. 1, 1977

[54] STRUCTURAL CONNECTION
[75] Inventor: Joseph N. Laborde, Baton Rouge, La.
[73] Assignee: Ethyl Corporation, Richmond, Va.
[22] Filed: Dec. 2, 1974
[21] Appl. No.: 528,633

Related U.S. Application Data
[63] Continuation of Ser. No. 173,029, Aug. 19, 1971, abandoned.

[52] U.S. Cl. .............................. 403/247; 403/363; 403/346; 52/758 R
[51] Int. Cl.² .......................................... F16B 7/00
[58] Field of Search ............ 52/241, 349, 480, 656, 52/732, 751, 758 R, 758 A, 758 H; 211/177; 46/28, 29, 27, 23; 403/242, 263, 230, 231, 363, 232

[56] References Cited
UNITED STATES PATENTS

| | | | |
|---|---|---|---|
| 1,194,320 | 8/1916 | Pucillo | 52/669 |
| 2,931,468 | 4/1960 | Keller | 428/46 |
| 3,204,382 | 9/1965 | McGurn | 52/349 |
| 3,304,684 | 2/1967 | Mock et al. | 52/758 A X |
| 3,680,271 | 8/1972 | Satchell | 52/696 |

FOREIGN PATENTS OR APPLICATIONS
587,047  4/1947  United Kingdom ............... 403/230

Primary Examiner—Andrew V. Kundrat
Attorney, Agent, or Firm—Donald L. Johnson; John F. Sieberth; Paul H. Leonard

[57] ABSTRACT

A structural connection or clip-in joist especially adapted for a framing system for a building, house, storage cabinet, or the like. The connection comprises a special channel extrusion joist having a slot or cut in each leg thereof opposite each other and near the end of the joist or structural member. The slotted end section of the joist is adapted to be inserted or snapped-in a second structural member, such as an I-beam or channel member or other structural member having a similar configuration. The members are preferably made of structural aluminum, but can also be made from metals such as iron, steel and the like or plastics such as PVC, ABS, styrene and the like. A wide variety of types of structural materials may be used, depending upon the particular requirements of the end or resulting construction.

4 Claims, 3 Drawing Figures

STRUCTURAL CONNECTION

This is a continuation of application Ser. No. 173,029, filed on Aug. 19, 1971, now abandoned.

BACKGROUND OF THE INVENTION

The present invention is in the general field of static structures, e.g., buildings, and provides a simple clip-in joist or channel member adapted to be received by a bent member such as an I-beam or channel member of a similar configuration and frictionally held in place. The clip-in joist when combined with two other structural members, an I-beam member and a channel member provides a simple framing system for a readily assembleable building or structure. A framing system of this type is usually formed from parts that are considered standard and which are capable of being assembled with considerable ease and in a relatively short period of time. Prior art joists are generally connected to other structural members by fasteners such as bolts, rivets, nails or the like or by welding. Such prior art methods of fastening require time and materials.

It is therefore a primary object of the instant invention to provide a structural member which may be readily attached to another structural member without the necessity of fasteners, welding or the like and which will produce a rigid and strong structure.

Another important object of this novel clip-in joist is to provide a flush structure upon which sheathing or decking materials may be easily attached or secured thereon.

Other objects and advantages of the invention will be more readily apparent from a consideration of the following description and drawings.

SUMMARY OF THE INVENTION

The structural member of the present invention comprises a channel member, preferably an extruded aluminum member, in which opposing slots or cuts are made in each leg thereof and on one or both ends of the channel member. The slots in an end of the channel member or joist are located equi-distant from the tip of the member in substantially a parallel relationship with each other. Each pair of slots is located a distance from the end of the channel member which corresponds substantially to the depth of opening of the structural member into which the joist is to be inserted. The portions of the legs of the channel member 81 to be inserted into a second structural member, such as an I-beam or a channel member, are sufficiently flexible that they may be bent inwardly towards each other. After the end legs of the joist have been sufficiently bent they are then inserted or snapped-in into the joining member and held in place by friction. After the members are joined together, the exterior surface of the legs of the joist and the exterior surface of the joining member are substantially flush with each other to provide a substantially flat surface for receiving a decking or sheathing member.

A plurality of the clip-in joists of this invention are readily connected or joined with other structural members to form a framing system for a building or other structure.

DESCRIPTION OF THE PREFERRED EMBODIMENT

Figure 1:
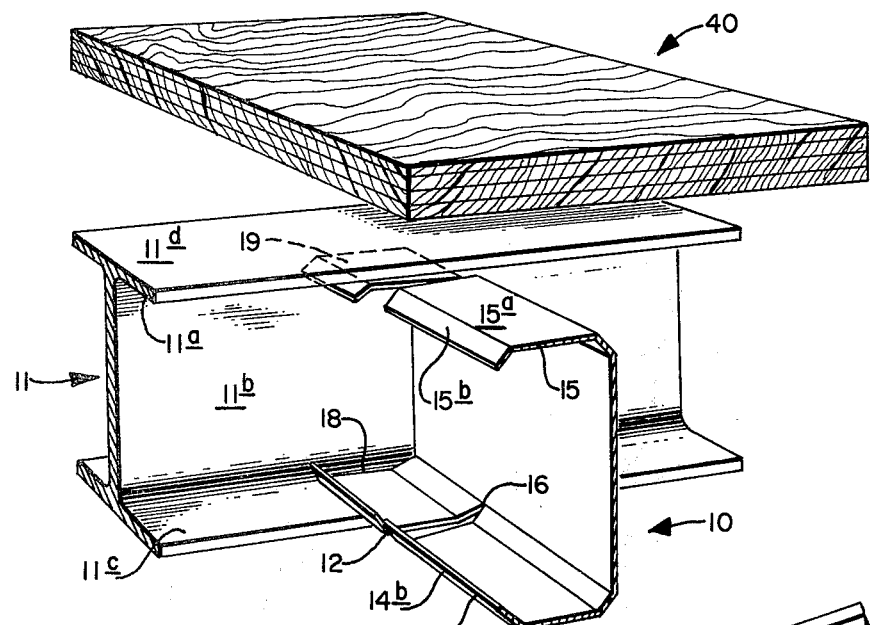
FIG. 1 is a perspective view of the clip-in joist channel extrusion member of the present invention and illustrates such joist joined to an I-beam member and further illustrates a sheet member for placing on the connected members.

Referring to FIG. 1 of the drawings, the special channel extrusion member 10 is shown connected to an I-beam member 11. The member 10 has a pair of slots or cuts 12 and 13 extending through the legs 14 and 15, respectively, of the channel member 10 and opposite to each other. Preferably, the cuts 12 and 13 extend the lengths of their respective legs 14 and 15 as shown for example at 16. The slots 12 and 13 provide end members or legs 18 and 19 which have been bent toward each other so as to permit the member 10 to be snapped into or inserted into the I-beam 11. The end legs or leg portion 18 and 19 are adjacent the internal facings 11a, 11b and 11c of the I-beam member 11 and produce a tight frictional fit of the member 10 with the member 11. The surface 15a of the member 10 is flush or in the same plane with the surface 11d of the member 11 so that a decking or sheathing member 40 may be placed flat or flush thereon.

In a preferred form of the invention, the member 10 is of the configuration shown in FIG. 1; however, variations may be made without departing from the scope of the invention. Each of the legs 14 and 15 have inwardly bent portions 14b and 15b, respectively. Such construction not only provides additional strength in the member 10 but facilitates insertion of the joist 10 in a joining member such as I-beam 11.

The joist or structural member 10 of the present invention is preferably made from structural aluminum. The term structural aluminum encompasses all of the various alloys of aluminum commonly used in the construction industry and any other alloys of aluminum suitable for this type of construction. The members to which the joist is connected are also preferably made from structural aluminum.

In addition to structural aluminum, the joist and its joining members may be made from a variety of construction materials. Some examples of these materials are iron, steel, galvanized steel, plastics such as PVC, ABS, styrene and fiberglass. Alloy 2014 (Aluminum Association Designation) is particularly desirable. The only requirements are that the materials be sufficiently strong and rigid for the purpose intended and that the legs of the channel members are sufficiently flexible that they can readily be bent for insertion in another member and will provide a frictional fit therewith.

The connecting or joining member may be an I-beam 11 or channel member. Such joining member should have a sufficient receiving area or internal surface to accept the slotted leg parts of the channel member of this invention and provide a strong, rigid, frictionally tight connection therewith.

The joint or framing member of this invention can be factory made with a minimum amount of tooling equipment. It is preferably made by extrusion. The members can be made to predetermined lengths and sizes depending upon the type of building or structure desired to be erected. One or both ends of the member may be slotted, but it is anticipated that most construction uses would require slots on each end.

Figure 2:
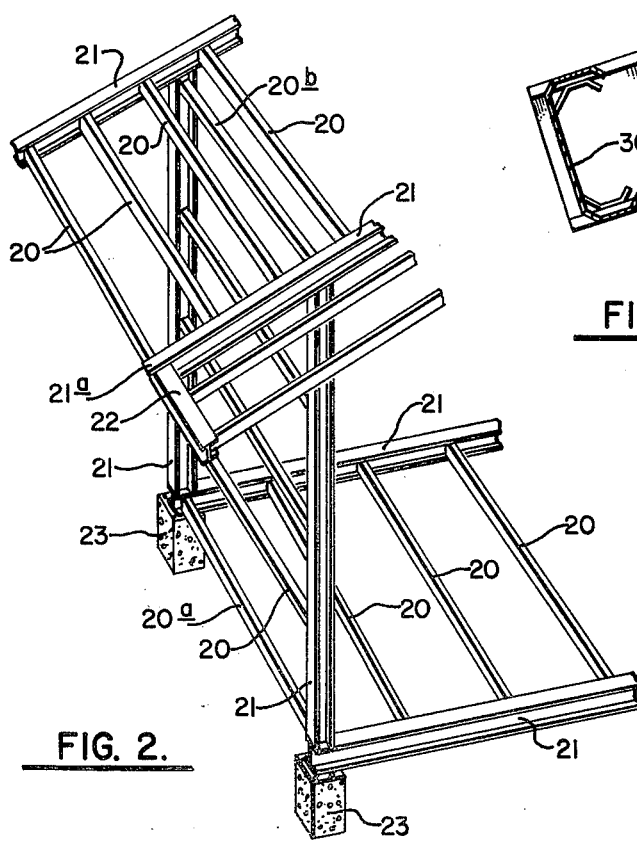
FIG. 2 is a perspective view of a building framing system illustrating a use of the special channel extrusion member of the instant invention as a joist or stud.

In FIG. 2, a section of a typical bay module showing how the special channel members of this invention may be used in constructing or framing a building. A plurality of clip-in joists or special channel members 20 all of the same length are inserted in I-beam members 21. The joists are held in place by friction. The I-sections are bolted together or fastened by other suitable means.

A simple framing system is provided which consists of three basic structural members, the special channel extrusion member of the invention, an I-beam member and a channel member, the latter two members, being standard construction items. The I-sections are bolted or fastened together to form a basic structural bent. The bents are positioned on predetermined centers and are spaced perfectly by erection channel members. The joined connections are fabricated so that all members will be plumb and square. In FIG. 2, the bent member 21a is shown with a short I-section outlooker 22 welded along the rake to form a roof overhang at the end of the structure. Decking or sheathing is standard sized and is aligned with the center lines of the bent and fastened to the joists 20 and to the bent with power drilled self-tapping metal fasteners. When roof, floor and interior wall sheathing is secured by power driven or other fastening at predetermined centers on all members, the resulting diaphragm action of all members working together completes the structural integrity of the system. Erection channels 20a and 20b and others not shown may be removed for reuse in other structures. Typical pier foundations 23 of a prescribed size provide column support.

Figure 3:
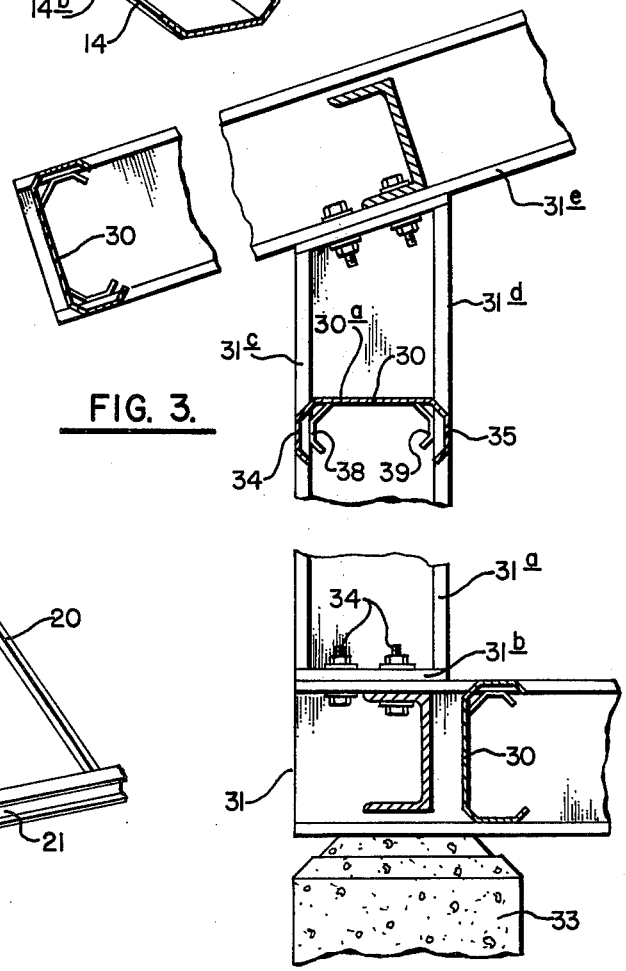
FIG. 3 is an enlarged view, partially in section, of a portion of the framing section of FIG. 2 showing the details of several clip-in joist members of the present invention joined to other structural members.

In FIG. 3 of the drawings, structural details of the framing system of FIG. 2 may be readily seen. The I-beam 31 rests on the pier or pillar 33 and has an I-beam 31a with a footing or base plate 31b welded thereon and is attached thereto by bolts 32. I-beam 31e is similarly attached to I-beam 31a. The special extruded channel members 30 are illustrated in joining relationship with their respective I-beam members. For example, the end portions 38 and 39 of the member 30a are shown in their frictionally tight position in the I-beam 31a. The legs 34 and 35 of the stud 30a are flush with the external surfaces 31c and 31d, respectively, of the I-beam 31a. The other special extrusion members 30 are similarly joined with their respective I-beam members.

The invention may be used with wide flange beams or channel structural frames. The length of the clip-in joist is varied to conform with the particular type of structural member to which it is to be joined.

The erection channels are for precise dimension erection of a structural frame and for stability until the sheathing is applied. Once the decking or sheathing is fastened to the joist system, the erection channels may be removed as the entire system has obtained its structural integrity. The channels are salvageable for use on succeeding units.

In addition to the foregoing advantages, the present invention provides for a structure which can be readily erected on a previously prepared foundation with a minimum of tools. Structures may also be built in two or more sections at a factory and the completed units assembled or combined at the building site.

Side walls studs are horizontal rather than vertical and can have suitable holes stamped therein for placement of electrical wiring. End walls and interior walls may be framed with wood, aluminum or steel studs in a conventional manner.

The instant invention provides a new and novel construction member which may be combined with other structural members to produce a framing system for structures such as buildings and the like which can be assembled with relative ease and with a minimum of man-power.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A structural connection comprising, a special channel member and a special receiving structural member joined thereto; said special channel member having a pair of vertical legs extending substantially the length thereof and each joined to the base of the channel by an inclined corner wall, said channel member legs having bendable leg portions formed on one end thereof by opposing cuts extending through said channel member vertical legs and said inclined walls, said cuts extending the height of said channel member vertical legs; said leg portions being bent toward each other; said special receiving structural member having a pair of legs extending substantially the length thereof, said structural member legs being spaced apart and having an opening therebetween, said opening being of a size sufficiently large for receiving said bent toward each other leg portions but sufficiently small for rejecting said channel member legs; said bendable leg portions of said special channel member being inserted in said opening between said legs of said special structural member in a tight frictional relationship without distortion in said structural receiving member; and, the external surfaces of said vertical legs of said special channel member being substantially flush with the external surfaces of said legs of said special structural receiving member, thereby providing a substantially flat surface for receiving a decking or sheathing member.

2. The structural connection of claim 1, wherein said special channel member and said receiving structural member are made from extruded structural aluminum.

3. The structural connection of claim 1, wherein said special channel member and said receiving structural member are made from iron, steel, galvanized steel or the like.

4. The structural connection of claim 1, wherein said special channel member and said receiving structural member are made from plastic, ABS plastic, PVC plastic, styrene plastic, fiber glass or the like.

* * * * *

UNITED STATES PATENT OFFICE
CERTIFICATE OF CORRECTION

PATENT NO. : 4,005,941
DATED : February 1, 1977
INVENTOR(S) : Joseph N. LaBorde

It is certified that error appears in the above-identified patent and that said Letters Patent are hereby corrected as shown below:

Column 1, line 48, "channel member 81 to be", should read -- channel member formed on the ends thereof by the slots and which are to be --.

Signed and Sealed this

Fifth Day of September 1978

[SEAL]

Attest:

RUTH C. MASON
Attesting Officer

DONALD W. BANNER
Commissioner of Patents and Trademarks